United States Patent
Li et al.

(10) Patent No.: US 11,445,582 B2
(45) Date of Patent: Sep. 13, 2022

(54) ZERO CURRENT CONTROLLED DIMMING CIRCUIT AND A METHOD THEREOF

(71) Applicant: Chengdu Monolithic Power Systems Co., Ltd., Chengdu (CN)

(72) Inventors: Hui Li, Hangzhou (CN); Siran Wang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 17/182,790

(22) Filed: Feb. 23, 2021

(65) Prior Publication Data
US 2021/0298141 A1    Sep. 23, 2021

(30) Foreign Application Priority Data
Mar. 17, 2020 (CN) .......................... 202010188973.8

(51) Int. Cl.
| | | |
|---|---|---|
| *H05B 45/14* | (2020.01) | |
| *H05B 45/345* | (2020.01) | |
| *H05B 45/3725* | (2020.01) | |
| *H02M 1/08* | (2006.01) | |

(52) U.S. Cl.
CPC ............ *H05B 45/14* (2020.01); *H02M 1/083* (2013.01); *H05B 45/345* (2020.01); *H05B 45/3725* (2020.01)

(58) Field of Classification Search
CPC .............. H05B 45/345; H05B 45/3725; H05B 45/3577; H05B 45/37; H05B 47/16; H02M 1/083
See application file for complete search history.

(56) References Cited

U.S. PATENT DOCUMENTS

| | | | |
|---|---|---|---|
| 7,893,677 B2 | 2/2011 | Nguyen | |
| 7,928,713 B2 | 4/2011 | Nguyen | |
| 2004/0012347 A1* | 1/2004 | Ribarich | H05B 41/2981 315/291 |
| 2007/0229001 A1* | 10/2007 | McIntosh | H05B 45/10 315/307 |
| 2010/0026208 A1* | 2/2010 | Shteynberg | H05B 45/3725 315/297 |
| 2013/0154484 A1* | 6/2013 | Xu | H05B 45/46 315/122 |
| 2014/0091720 A1* | 4/2014 | Brinlee | H05B 45/3725 315/186 |

FOREIGN PATENT DOCUMENTS

DE    102010041632 A1 *  3/2012  ......... H05B 33/0815

* cited by examiner

*Primary Examiner* — Abdullah A Riyami
*Assistant Examiner* — Syed M Kaiser
(74) *Attorney, Agent, or Firm* — Perkins Coie LLP

(57) ABSTRACT

A control circuit of a zero current controlled dimming circuit having a high side power switch, a low side power switch and an inductor, having: an error circuit, providing a compensation signal based on a reference signal and a current sense signal indicative of an output current; a compensation circuit, providing a compensation off time signal based on the compensation signal and a peak value sample and hold signal indicative of a peak value of an inductor current; and a control signal generating circuit, providing a low side switch control signal to control the low side power switch based on the compensation off time signal, wherein after the inductor current decreases to zero, the low side power switch maintains on for a compensation off time period determined by the compensation off time signal.

19 Claims, 3 Drawing Sheets

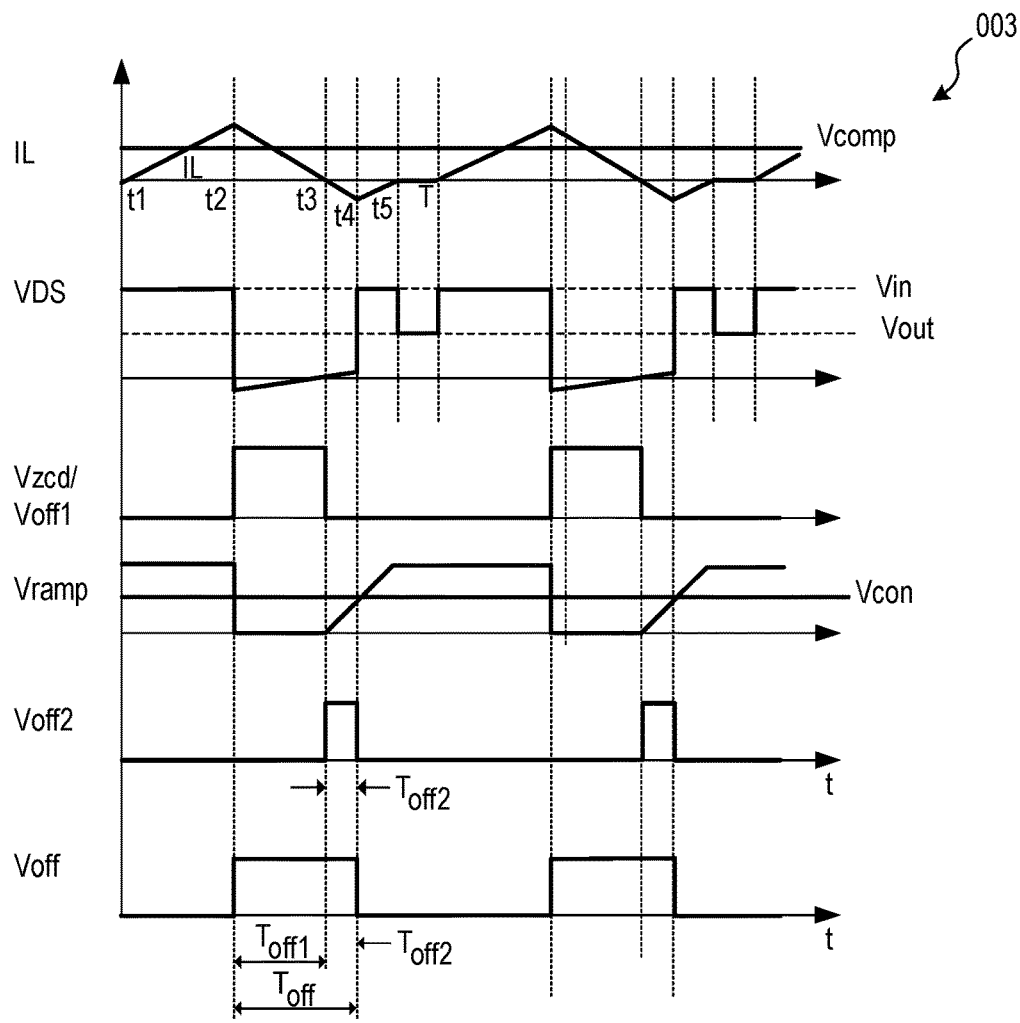

FIG. 5 generating a compensation signal based on a current sense signal indicating an output current and a reference signal generating a time period control signal based on the compensation signal and a peak value sample and hold signal indicating a peak value of an inductor current generating a compensation off time signal based on the time period control signal and a slop reference signal controlling the low side power switch being on for a compensation off time period after the inductor current flowing through the inductor decreases to zero

FIG. 6

ZERO CURRENT CONTROLLED DIMMING CIRCUIT AND A METHOD THEREOF

CROSS-REFERENCE TO RELATED APPLICATIONS

This application claims priority to and the benefit of Chinese Patent Application No. 202010188973.8, filed on Mar. 17, 2020, which is incorporated herein by reference in its entirety.

FIELD

The present invention relates generally to electronic circuits, and more particularly but not exclusively to a dimming circuit of a light emitting device and a method thereof.

BACKGROUND

For LED (Light-emitting Diode) lighting, dimming depth is a very important character. Deep dimming and stable output are ultimate pursuits for LED lighting. For LED deep analog dimming, CCM (Continuous Conduction Mode) control is commonly adopted by traditional dimming circuit. However, under light load, most of the output current does not flow through the LEDs with CCM control, which results in high power loss and low efficiency.

SUMMARY

It is an object of the present invention to provide a zero current controlled dimming mechanism utilized with CCM control dimming circuit to improve efficiency of CCM control dimming circuit under light load.

In accomplishing the above and other objects, there has been provided, in accordance with an embodiment of the present invention, a control circuit of a zero current controlled dimming circuit having a high side power switch, a low side power switch and an inductor, and providing an output current to a load, the control circuit comprising: an error circuit, configured to provide a compensation signal based on a reference signal and a current sense signal indicative of the output current; a compensation circuit, configured to provide a compensation off time signal based on the compensation signal and a peak value sample and hold signal indicative of a peak value of an inductor current flowing through the inductor; and a control signal generating circuit, configured to provide a low side switch control signal to control the low side power switch based on the compensation off time signal, wherein after the inductor current decreases to zero, the low side power switch maintains on for a compensation off time period determined by the compensation off time signal.

In accomplishing the above and other objects, there has been provided, in accordance with an embodiment of the present invention, a zero current controlled dimming circuit, comprising: a high side power switch; a low side power switch, coupled in series with the high side power switch; an inductor, having a first terminal coupled to a connection node of the high side power switch and the low side power switch, and a second terminal coupled to an input voltage or an output voltage; an error circuit, configured to provide a compensation signal based on a reference signal and a current sense signal indicative of an output current of the zero current controlled dimming circuit; a compensation circuit, configured to provide a compensation off time signal based on the compensation signal and a peak value sample and hold signal indicative of a peak value of an inductor current flowing through the inductor; and a control signal generating circuit, configured to provide a low side switch control signal to control the low side power switch based on the compensation off time signal, wherein after the inductor current decreases to zero, the low side power switch maintains on for a compensation off time period determined by the compensation off time signal.

In accomplishing the above and other objects, there has been provided, in accordance with an embodiment of the present invention, a control method of a zero current controlled dimming circuit having a high side power switch, a low side power switch and an inductor, the control method comprising: generating a compensation signal based on a current sense signal indicating an output current of the zero current controlled dimming circuit, and a reference signal; generating a time period control signal based on the compensation signal and a peak value sample and hold signal indicating a peak value of an inductor current flowing through the inductor of the zero current controlled dimming circuit; generating a compensation off time signal based on the time period control signal and a slope reference signal; and controlling the low side power switch being on for a compensation off time period after the inductor current flowing through the inductor decreases to zero.

BRIEF DESCRIPTION OF THE DRAWINGS

FIG. 5 shows waveforms of the signals of the zero current controlled dimming circuit utilized with the control circuit 20-1 in FIG. 4 in accordance with an embodiment of the present invention.

FIG. 6 shows a flow chat 004 of a control method of a zero current controlled dimming circuit in accordance with an embodiment of the present invention.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art would recognize, however, that the invention can be practiced without one or more of the specific details. In other instances, well-known details are not shown or described to avoid obscuring aspects of the invention.

Figure 1:
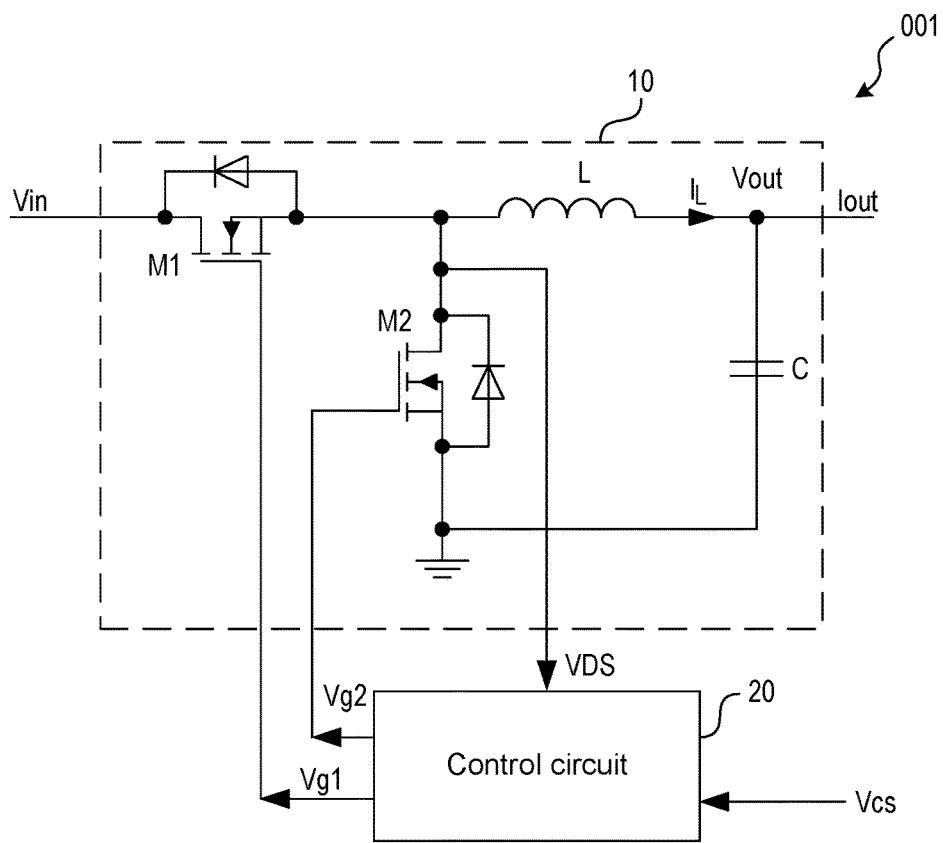
FIG. 1 schematically shows a zero current controlled dimming circuit 001 in accordance with an embodiment of the present invention.

FIG. 1 schematically shows a zero current controlled dimming circuit 001 in accordance with an embodiment of the present invention. In the example of FIG. 1, the zero current controlled dimming circuit 001 comprises a switching circuit 10 and a control circuit 20. The switching circuit 10 comprises a high side power switch M1, a low side power switch M2 and an inductor L. The switching circuit 10 receives an input voltage Vin, provides an output current Iout and an output voltage Vout. IL is an inductor current flowing through the inductor L. The control circuit 20 provides driving signals Vg1 and Vg2 to respectively control the high side power switch M1 and the low side power switch M2.

Figure 2:
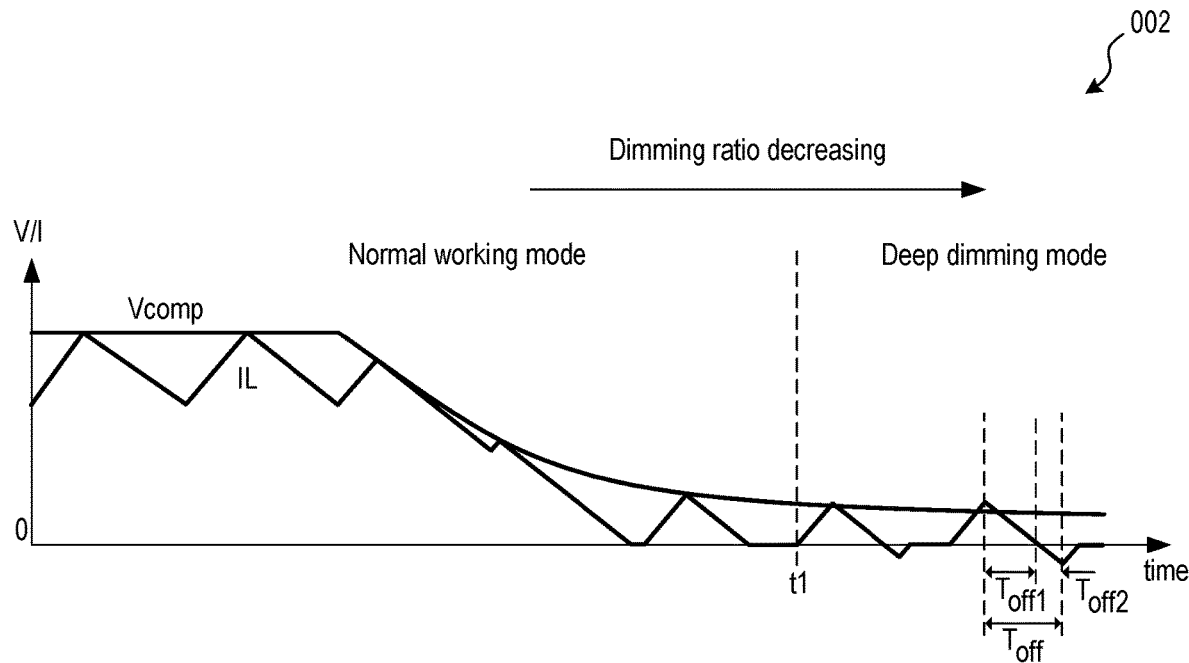
FIG. 2 shows the waveform of the inductor current IL of the zero current controlled dimming circuit 001 in accordance with an embodiment of the present invention.

FIG. 2 shows the waveform of the inductor current IL of the zero current controlled dimming circuit 001 in accordance with an embodiment of the present invention. As shown in FIG. 2, the zero current controlled dimming circuit 001 has two working modes, i.e., normal working mode and deep dimming mode. When the zero current controlled dimming circuit 001 works under normal working mode, which as shown in FIG. 2 is the time period before time t1, the peak value of the inductor current IL is equal to a compensation signal Vcomp, which determines an on time period of the high side power switch M1. After time t1, the zero current controlled dimming circuit 001 enters deep dimming mode. Under deep dimming mode, the on time period of the high side power switch M1 reaches its minimum. The peak of the inductor current IL is higher than the compensation signal Vcomp. By keeping the low side power switch M2 on for a compensation time period Toff2 after the inductor current IL decreases to 0, i.e., the low side power switch M2 keeps on for the compensation time period Toff2 after a reference time period Toff1, the on time period of the low side power switch M2, i.e., the off time period of the high side power switch M1 is Toff=Toff130 Toff2. The compensation off time period Toff2 allows the inductor conducting current after the inductor current IL decreases to zero, which makes the inductor current IL being negative during the compensation time period Toff2, and lowers the RMS (Root Mean Square) of the inductor current IL. By adjusting the parameter of the zero current controlled dimming circuit 001 in real application, the RMS of the inductor current IL could be zero, and the zero current controlled dimming circuit is realized. In this way, the power loss of the circuit is minimized and the efficiency is improved.

Figure 3:
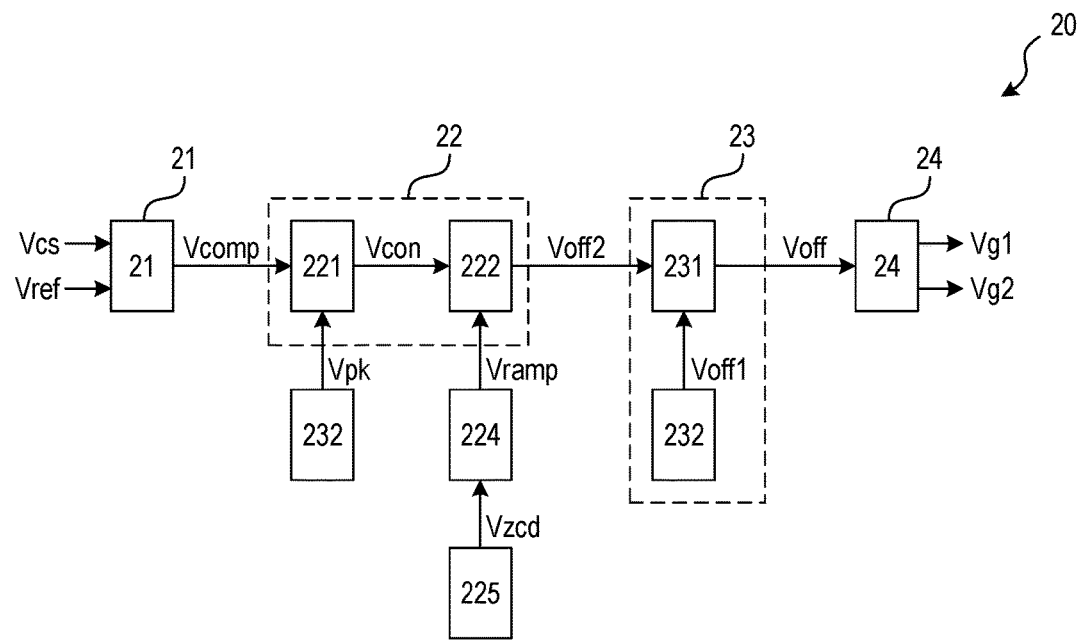
FIG. 3 schematically shows the control circuit 20 for the zero current controlled dimming circuit 001 in accordance with an embodiment of the present invention.

FIG. 3 schematically shows the control circuit 20 for the zero current controlled dimming circuit 001 in accordance with an embodiment of the present invention. As shown in FIG. 3, the control circuit 20 comprises an error circuit 21, a compensation circuit 22 and a control signal generating circuit 23.

The error circuit 21 receives a current sense signal Vcs indicating the output current Iout, and a reference signal Vref, and provides the compensation signal Vcomp. The reference signal Vref represents a target value of the output current Iout.

The compensation circuit 22 receives the compensation signal Vcomp and a peak value sample and hold signal Vpk, and provides a compensation off time signal Voff2 to determine the compensation time period Toff2. The peak value sample and hold signal Vpk represents the peak value of the inductor current IL. When the compensation signal Vcomp is equal to the peak value sample and hold signal Vpk, the compensation time period Toff2 is zero. In one embodiment, the control circuit 20 further comprises a peak value sample and hold circuit 223, configured to sample and hold the peak value of the inductor current IL in a switching period of the zero current controlled dimming circuit 001, and provides the peak value sample and hold signal Vpk, wherein the switching period could be determined by a time period comprising an on time period and an off time period of the high side power switch M1 or the low side power switch M2. In one embodiment, the compensation circuit 22 comprises a difference circuit 221 and a compensation signal generating circuit 222. The difference circuit 221 receives the compensation signal Vcomp and the peak value sample and hold signal Vpk, and provides a time period control signal Vcon. The compensation signal generating circuit 222 receives the time period control signal Vcon and a slope reference signal Vramp, and provides the compensation off time signal Voff2. In one embodiment, the control circuit 20 further comprises a zero-cross detecting circuit 225 and a slope reference signal generating circuit 224. The zero-cross detecting circuit 225 detects a drain-source voltage VDS of the low side power switch M2, and provides a zero-crossing signal Vzcd to indicate a zero-crossing point of the drain-source voltage, i.e., the zero-crossing signal Vzcd flips when the drain-source voltage VDS crosses zero. In one embodiment, when the drain-source voltage VDS crosses zero from negative to positive, the zero-crossing signal Vzcd flips, and the slope reference signal Vramp increases from zero with a given slope.

The control signal generating circuit 23 provides a low side switch control signal Voff based on the compensation off time signal Voff2, to control the low side power switch M2 keeping on after the inductor current IL decreases to zero. In one embodiment, the control signal generating circuit 23 comprises a reference signal generating circuit 232 and a logic circuit 231. The reference signal generating circuit 232 provides a reference off time signal Voff1 which determines the reference time period Toff1, i.e., the time period from the low side power switch M2 turning on to the inductor current IL decreasing to zero. In one embodiment, the reference signal generating circuit 232 could be replaced by the zero-cross detecting circuit 225, wherein the zero crossing-signal Vzcd could be adopted as the reference time period Toff1. The logic circuit 231 adds the compensation off time signal Voff2 to the reference off time signal Voff1 to generate the low side switch control signal Voff which indicates the on time period Toff of the low side power switch M2.

In one embodiment, the control circuit 20 further comprises a driving circuit 24. The driving circuit 24 receives the low side switch control signal Voff and other related signals, and provides the driving signals Vg1 and Vg2 to respectively control the high side power switch M1 and the low side power switch M2.

Figure 4:
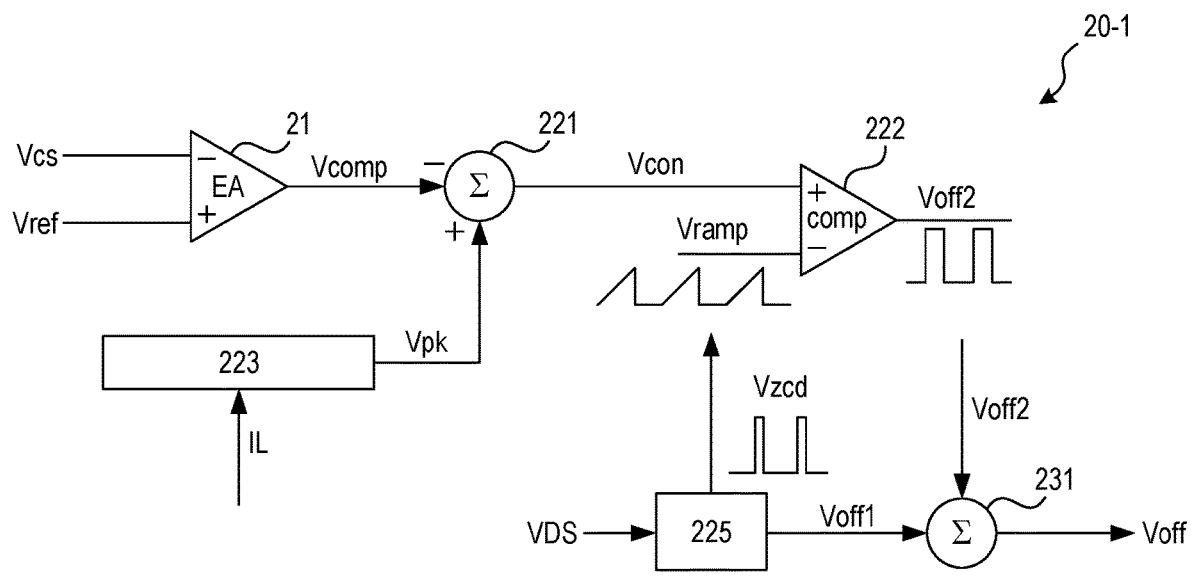
FIG. 4 schematically shows a control circuit 20-1 for the zero current controlled dimming circuit 001 in accordance with an embodiment of the present invention.

FIG. 4 schematically shows a control circuit 20-1 for the zero current controlled dimming circuit 001 in accordance with an embodiment of the present invention. As shown in FIG. 4, the error circuit 21 comprises an error amplifier EA, the difference circuit 221 comprises a subtracter, and the compensation signal generating circuit 222 comprises a comparator comp. In FIG. 4, the slope reference signal Vramp comprises a triangular waveform or a sawtooth waveform. The zero-crossing signal Vzcd, the reference off time signal Voff1 and the compensation off time signal Voff2 all have square waveforms.

FIG. 5 shows waveforms of the signals of the zero current controlled dimming circuit utilized with the control circuit 20-1 in FIG. 4 in accordance with an embodiment of the present invention. In FIG. 5, time t1 indicates the beginning of the switching period. During the time period between time t1 and time t2, the low side power switch M2 is turned off and the high side power switch M1 is turned on. During this time period, the drain-source voltage VDS of the low side power switch M2 is equal to the input voltage Vin of the zero current controlled dimming circuit. The reference off time signal Voff1, the zero-crossing signal Vzcd, the compensation off time signal Voff2 and the low side switch control signal Voff are all in low voltage level. At time t2, the inductor current IL increases to a peak. In the embodiment of FIG. 5, the on time period of the high side power switch M1, i.e., the time period t1~t2, is a minimum on time period of the zero current controlled dimming circuit. During the time period from time t2 to t3, the high side power switch M1 is turned off and the low side power switch M2 is turned on, then the inductor current IL decreases, and reaches 0 at time t3. During time t3 to time t4, the high side power switch M1 keeps off and the low side power switch M2 keeps on, the inductor current IL keeps decreasing after crossing zero. During time period t3~t4, the compensation off time signal Voff2 generated based on the comparison result of the time period control signal Vcon and the slope reference signal Vramp is in high voltage level. In one embodiment, the slope reference signal Vramp increases from time t3 to time t5. In other embodiments, the end of the increasing of the slope reference signal Vramp could be set at any time after time t4 according to the application requirements and specs. In one embodiment, the drain-source voltage VDS of the low side power switch M2 increases during time period t2~t4, and crosses zero from negative to positive at time t3. During time period t4~t5, the low side power switch M2 is turned off, and a body diode of the high side power switch M1 is on. Then the drain-source voltage VDS of the low side power switch M2 is equal to the input voltage Vin of the zero current controlled dimming circuit, and the inductor current IL increases and reaches 0 at time t5. In the embodiment of FIG. 5, the time period t5~T exists because a maximum switching frequency of the zero current controlled dimming circuit is set. It should be appreciated that there is no time period t5~T when no maximum switching frequency is set in some embodiments. The time period t1~T is a switching period of the zero current controlled dimming circuit. After time T, a next switching period begins and the operation repeats.

FIG. 6 shows a flow chat 004 of a control method of a zero current controlled dimming circuit in accordance with an embodiment of the present invention. The control method comprises steps S1 to S4.

Step S1, generating a compensation signal based on a current sense signal indicating an output current of the zero current controlled dimming circuit and a reference signal.

Step S2, generating a time period control signal based on the compensation signal, and a peak value sample and hold signal indicating a peak value of an inductor current flowing through the inductor of the zero current controlled dimming circuit.

Step S3, generating a compensation off time signal based on the time period control signal and a slope reference signal, wherein the compensation off time signal represents a compensation off time period used to prolong an on time period of a low side power switch of the zero current controlled dimming circuit. In one embodiment, when a drain-source voltage of the low side power switch crosses zero from negative to positive, the slope reference signal increases.

Step S4, controlling the low side power switch being on for a compensation off time period after the inductor current decreases to zero.

As shown in FIG. 6, the control method further comprises providing a zero-crossing signal based on the drain-source voltage of the low side power switch, wherein the zero-crossing signal flips when the drain-source voltage of the low side power switch crosses zero.

In one embodiment, the control method further comprises generating a low side switch control signal based on the zero-crossing signal and the compensation off time signal, wherein the low side switch control signal determines the on time period of the low side power switch in a switching period.

In one embodiment, the control method further comprises keeping the high side power switch and the low side power switch being off after the compensation off time period until the end of the switching period.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A control circuit of a zero current controlled dimming circuit having a high side power switch, a low side power switch and an inductor, and providing an output current to a load, the control circuit comprising:
    an error circuit, configured to provide a compensation signal based on a reference signal and a current sense signal indicative of the output current;
    a compensation circuit, configured to provide a compensation off time signal based on the compensation signal and a peak value sample and hold signal indicative of a peak value of an inductor current flowing through the inductor; and
    a control signal generating circuit, configured to provide a low side switch control signal to control the low side power switch based on the compensation off time signal, wherein after the inductor current decreases to zero, the low side power switch maintains on for a compensation off time period determined by the compensation off time signal.

2. The control circuit of claim 1, wherein the error circuit comprises an amplifier.

3. The control circuit of claim 1, wherein the compensation circuit comprises:
    a difference circuit, having a first input terminal configured to receive the peak value sample and hold signal, a second input terminal configured to receive the compensation signal, and an output terminal configured to provide a time period control signal based on a difference of the peak value sample and hold signal, and the compensation signal; and
    a compensation signal generating circuit, having a first input terminal configured to receive the time period control signal, a second input terminal configured to receive a slope reference signal, and an output terminal configured to provide the compensation off time signal.

4. The control circuit of claim 3, wherein the difference circuit comprises a subtractor.

5. The control circuit of claim 3, wherein the compensation signal generating circuit comprises a comparator.

6. The control circuit of claim 1, further comprising:
    a zero-cross detecting circuit, configured to provide a zero-crossing signal based on a drain-source voltage across the low side power switch, wherein the zero-crossing signal flips when the drain-source voltage across the low side power switch crosses zero; and a slope reference signal generating circuit, configured to provide a slope reference signal based on the zero-crossing signal.

7. The control circuit of claim 6, wherein the control signal generating circuit comprises:
a logic circuit, configured to provide the low side switch control signal based on the compensation off time signal and the zero-crossing signal.

8. The control circuit of claim 1, wherein the control signal generating circuit comprises:
a reference signal generating circuit, configured to provide a reference off time signal; and
a logic circuit, configured to provide the low side switch control signal based on the compensation off time signal and the reference off time signal.

9. A zero current controlled dimming circuit, comprising:
a high side power switch;
a low side power switch, coupled in series with the high side power switch;
an inductor, having a first terminal coupled to a connection node of the high side power switch and the low side power switch, and a second terminal coupled to an input voltage or an output voltage;
an error circuit, configured to provide a compensation signal based on a reference signal and a current sense signal indicative of an output current of the zero current controlled dimming circuit;
a compensation circuit, configured to provide a compensation off time signal based on the compensation signal and a peak value sample and hold signal indicative of a peak value of an inductor current flowing through the inductor; and
a control signal generating circuit, configured to provide a low side switch control signal to control the low side power switch based on the compensation off time signal, wherein after the inductor current decreases to zero, the low side power switch maintains on for a compensation off time period determined by the compensation off time signal.

10. The zero current controlled dimming circuit of claim 9, wherein the compensation circuit comprises:
a difference circuit, having a first input terminal configured to receive the peak value sample and hold signal, a second input terminal configured to receive the compensation signal, and an output terminal configured to provide a time period control signal based on a difference of the peak value sample and hold signal, and the compensation signal; and
a compensation signal generating circuit, having a first input terminal configured to receive the time period control signal, a second input terminal configured to receive a slope reference signal, and an output terminal configured to provide the compensation off time signal.

11. The zero current controlled dimming circuit of claim 10, wherein the compensation signal generating circuit comprises a comparator.

12. The zero current controlled dimming circuit of claim 10, wherein the difference circuit comprises a subtractor, and the time period control signal has a magnitude being a value of the peak value sample and hold signal minus the compensation signal.

13. The zero current controlled dimming circuit of claim 9, further comprising:

a zero-cross detecting circuit, configured to provide a zero-crossing signal based on a drain-source voltage across the low side power switch, wherein the zero-crossing signal flips when the drain-source voltage across the low side power switch crosses zero; and a slope reference signal generating circuit, configured to provide a slope reference signal based on the zero-crossing signal.

14. The zero current controlled dimming circuit of claim 13, wherein the control signal generating circuit comprises:
a logic circuit, configured to provide the low side switch control signal based on the compensation off time signal and the zero-crossing signal.

15. The zero current controlled dimming circuit of claim 9, wherein the control signal generating circuit comprises:
a reference signal generating circuit, configured to provide a reference off time signal; and
a logic circuit, configured to provide the low side switch control signal based on the compensation off time signal and the reference off time signal.

16. A control method of a zero current controlled dimming circuit having a high side power switch, a low side power switch and an inductor, the control method comprising:
generating a compensation signal based on a current sense signal indicating an output current of the zero current controlled dimming circuit, and a reference signal;
generating a time period control signal based on the compensation signal and a peak value sample and hold signal indicating a peak value of an inductor current flowing through the inductor of the zero current controlled dimming circuit;
generating a compensation off time signal based on the time period control signal and a slope reference signal; and
controlling the low side power switch being on for a compensation off time period after the inductor current flowing through the inductor decreases to zero.

17. The control method of claim 16, wherein the slope reference signal increases from zero when a drain-source voltage across the low side power switch crosses zero from negative to positive.

18. The control method of claim 16, further comprising:
generating a zero-crossing signal based on a drain-source voltage across the low side power switch, wherein the zero-crossing signal flips when the drain-source voltage crosses zero; and
generating a low side switch control signal based on the zero-crossing signal and the compensation off time signal, wherein the low side switch control signal determines an on time period of the low side power switch in a switching period.

19. The control method of claim 16, further comprising:
generating a reference off time signal; and
generating a low side switch control signal based on the reference off time signal and the compensation off time signal; wherein
wherein the low side switch control signal determines an on time period of the low side power switch in a switching period.

* * * * *